United States Patent Office 2,934,898
Patented May 3, 1960

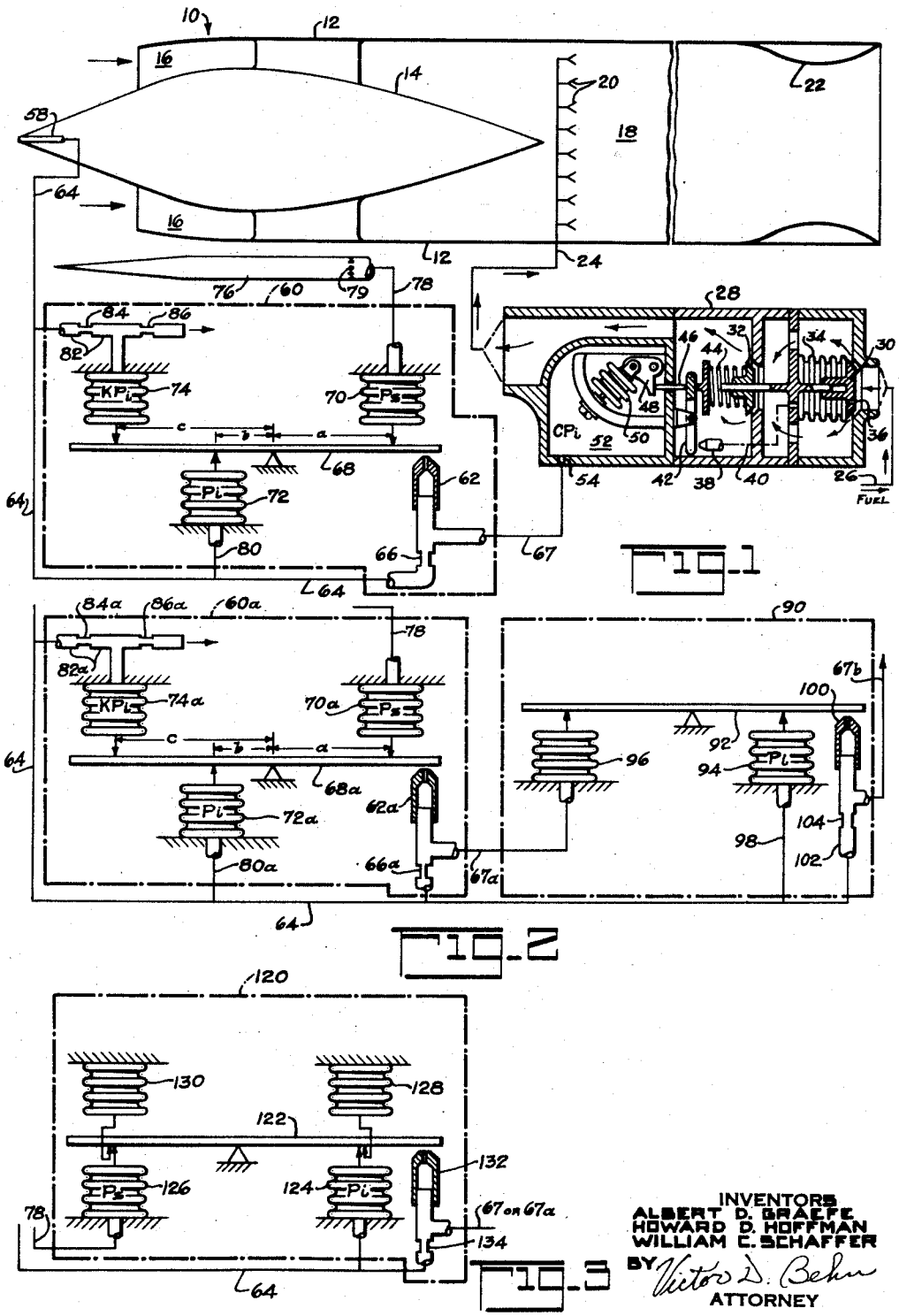

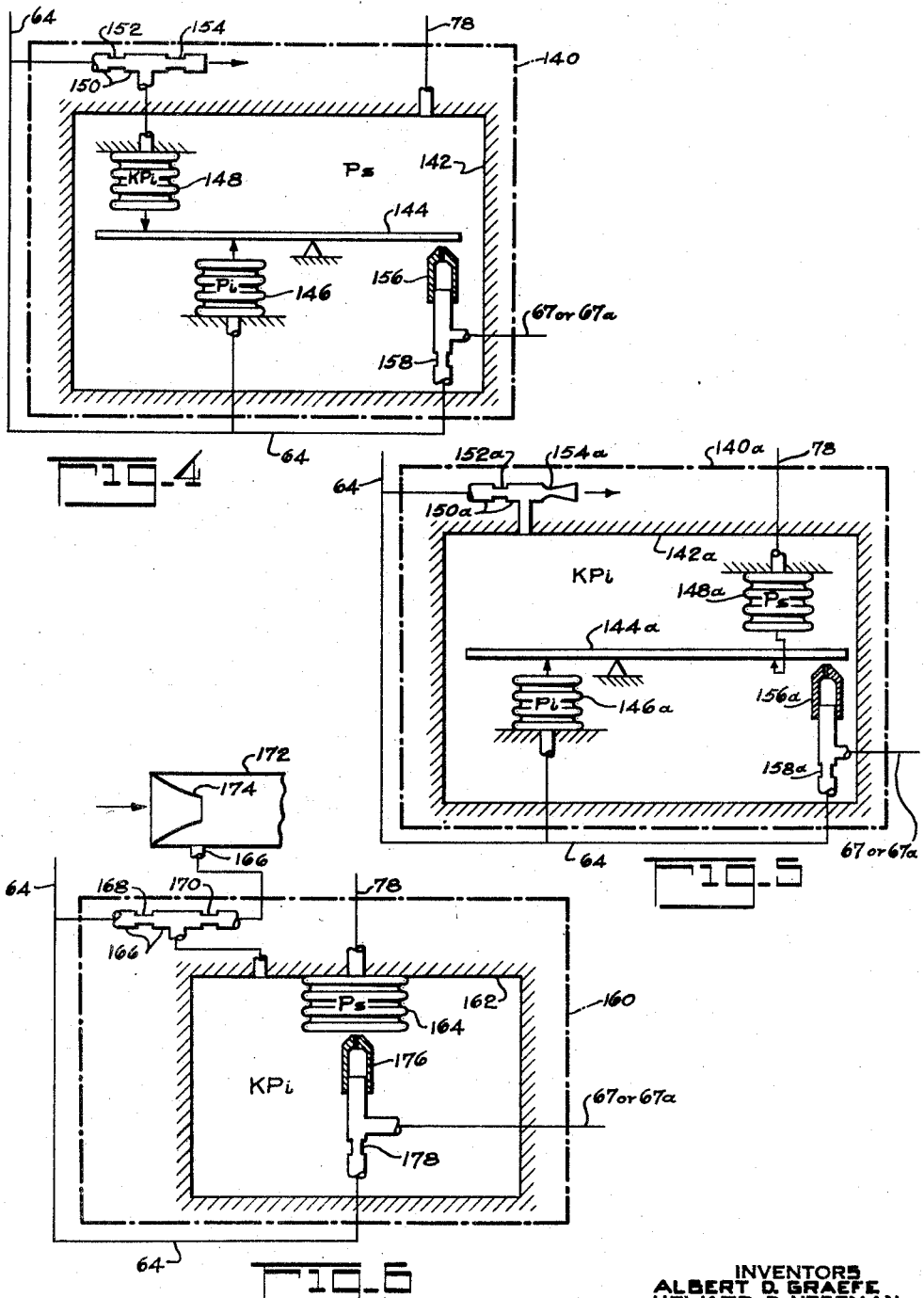

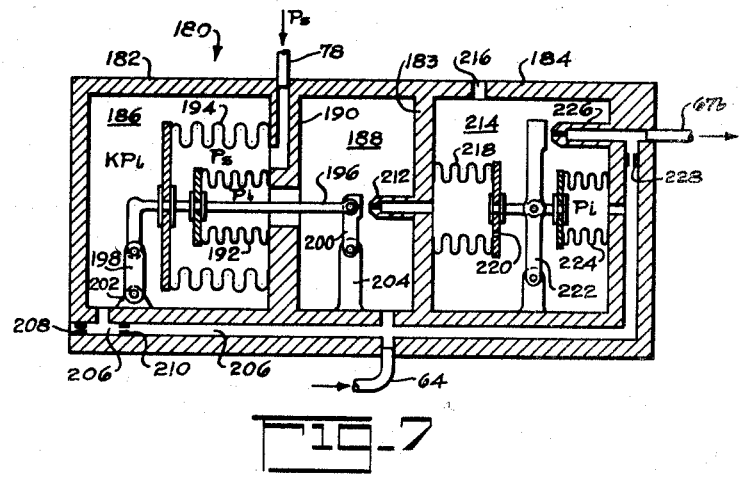

2,934,898
JET ENGINE THRUST CONTROL SYSTEM

Albert D. Graefe, Middle Village, N.Y., and Howard D. Hoffman and William C. Schaffer, Fair Lawn, N.J., assignors to Curtiss-Wright Corporation, a corporation of Delaware Application September 29, 1953, Serial No. 382,994

11 Claims. (Cl. 60—39.28)

This invention relates to control systems and is particularly directed to a mechanism and method for controlling aircraft jet engines.

The thrust output and therefore the speed of an aircraft jet engine generally is controlled by varying the engine fuel supply and/or by varying the area of the engine exhaust nozzle. When the engine speed is controlled by varying its fuel supply it is necessary that means be provided to maintain the fuel-air ratio of the combustible mixture within limits so that combustion is maintained. An object of the invention comprises the provision of a novel system for automatically controlling the engine fuel supply with changes in engine flight speed while at the same time maintaining the engine fuel-air ratio within predetermined limits.

The present invention comprises a novel system for maintaining a predetermined flight speed of an aircraft jet engine by (1) providing a control pressure which, at a given flight Mach number is proportional to the mass air flow into the engine and (2) varying the constant of proportionality between limits with changes in the flight Mach number.

Other objects of the invention will become apparent upon reading the annexed detailed description in connection with the drawing in which:

Fig. 1 is a schematic view of an aircraft ram-jet engine having a control system embodying the invention.

Fig. 2 is a schematic view of the control mechanism of Fig. 1 and including a relay for increasing the gain of the control mechanism; and Figs. 3, 4, 5, 6 and 7 are schematic views of modified forms of the control mechanism of Figs. 1 and 2.

Referring first to Fig. 1 of the drawing, a ram-jet aircraft engine is schematically indicated at 10 as comprising a duct-like housing member 12 having a centerbody 14 co-axially supported adjacent to its front end to provide an annular air inlet 16. The engine 10 has a combustion chamber 18 within the housing 12 to which fuel is supplied by burner apparatus 20. An exhaust nozzle 22 is provided at the rear end of the housing 12 through which the exhaust gases from the combustion chamber discharge rearwardly into the surrounding atmosphere to provide the engine with forward propulsive thrust. As is conventional the area of the nozzle 22 may be adjustable.

Fuel is supplied to the burner apparatus 20 through a fuel line 24 from a fuel pressure supply line 26 under control of a fuel regulating device 28 which preferably is similar to that fully disclosed in copending application Serial No. 286,364 filed May 6, 1952 now Patent Number 2,766,579. As schematically illustrated in Fig. 1, the fuel regulating device 28 includes a main valve 30 and an auxiliary valve 32 disposed in series with and downstream of said main valve. The main valve 30 is supported by and is urged in a valve closing direction by an elastically flexible bellows-type diaphragm 34 the interior of which communicates with the upstream side of main valve through a restricted passage 36. A nozzle 38 has its upstream side communicating with the interior of the bellows 34 via a passage 40 such that a small quantity of fuel flows through the restriction 36 and discharges through the nozzle 38 into the fuel passage of the regulator 28 downstream of the auxiliary valve 32. One end of a lever 42 overlies the discharge end of the nozzle 38 to function as a baffle member for said nozzle. A spring 44 is disposed between the lever 42 and the auxiliary valve 32 so as to urge the lever 42 in a nozzle closing direction and to urge the valve 32 in a closing direction against the fuel pressure differential across said valve. The force of the spring 44 on the lever 42 is opposed by a second force transmitted thereagainst by a pin 46 from a lever 48 and bellows-type flexible diaphragm 50. The bellows 50 is disposed in a closed chamber 52 to which a pressure is transmitted by a passage 54.

With this construction of the fuel regulating device 28, if, for example, the pressure in the chamber 52 acting against the bellows 50 increases the lever 42 moves away from the nozzle 38 to effect an opening adjustment of said nozzle to increase the leakage fuel flow therethrough. This increase in fuel flow through the nozzle 38 increases the fuel pressure drop across the restriction 36 thereby increasing the valve opening fluid pressure force acting on the main valve 30 against the elasticity of the bellows 34. The main valve 30 thereupon opens to increase the fuel flow until the resulting increase in the fuel pressure differential on the auxiliary valve 32 is such that the increase in the force exerted by said auxiliary valve 32 on the lever 42 through the spring 44 rebalances the forces on the lever 48. In this way, as more fully explained in said copending application, the regulating device 28 regulates the fuel flow therethrough in proportion to the magnitude of the pressure in the chamber 52.

The pressure in the chamber 52 is obtained from a pitot or total head tube 58 under control of a mechanism 60, said tube being directed upstream into the line of flight. As illustrated the tube 58 may be mounted at the forward end of the center body 14. At subsonic flight speeds the total pressure $P_i$ measured by the Pitot tube 58 is equal to the total pressure of the surrounding airstream relative to said tube and engine 10. At supersonic flight speeds, however, a normal shock wave occurs across the front end of the pitot tube. Because of the losses in said normal shock wave, the total pressure $P_i$ in the tube 58, at supersonic flight speeds, is less than the actual total pressure of the surrounding atmosphere relative to said tube and engine 10, the magnitude of this difference increasing with increase in the flight Mach number. In order to distinguish between the actual total pressure of a fluid relative to a body and the total pressure of said fluid as measured by a pitot tube, this latter or pitot tube measured pressure is herein termed the "impact pressure" of said fluid relative to said body. As explained in said copending application, in at least a limited supersonic speed range, the impact pressure $P_i$ of the surrounding air relative to the engine is a measure of the mass air flow into the engine.

As illustrated in Fig. 1 the control mechanism 60 includes an air bleed nozzle 62 which is connected to the pitot tube 58 through a line 64 having a restriction 66. A line 67 connects the passage 54 of the fuel regulating device chamber 52 to the line 64 at a point between the restriction 66 and nozzle 62. The nozzle 62 discharges into the space within which the control mechanism 60 is housed, for example said mechanism may be housed within the center body 14. At supersonic flight speeds the ambient pressure $P_a$ within the centerbody 14 in general will differ from the static pressure $P_s$ of the surrounding atmosphere by no more than about 30%.

At this point it should be noted that as hereinafter used by the "critical pressure ratio" of a restriction in a fluid flow path is meant the minimum ratio of the static fluid pressure upstream of the restriction to the static fluid pressure downstream of the restriction at which the fluid flow velocity at the throat of the restriction is sonic.

If a pneumatic flow path has two restrictions in series and the pressure ratio across the downstream restriction is equal to or exceeds the critical pressure ratio of said restriction then the pressure intermediate said restrictions is independent of the discharge or ambient pressure and is proportional to the supply pressure. Accordingly if the air pressure ratio across the nozzle 62 is always above the critical value then the pressure intermediate said nozzle and restriction 66 will be independent of variations in the ambient pressure P$a$ and, for a fixed effective flow area of the restriction 66 and the nozzle restriction 62, said intermediate pressure will be proportional to P$i$. That is for a fixed flow resistance of the nozzle 62 and restriction 66 the pressure within the chamber 52 of the fuel regulating device 28 will be independent of the ambient pressure P$a$ and will be proportional to P$i$ or equal to CP$i$ where C is the constant of proportionality. Under these conditions, since P$i$ is proportional to the mass air flow into the engine 10, the fuel regulating device will operate to maintain a predetermined fuel-air ratio of the combustible mixture supplied to the combustion chamber 18.

The magnitude of the constant C can be changed by varying either the restriction 66 or the nozzle restriction 62 or both thereby changing the fuel-air ratio maintained by the fuel regulating device 28. For this purpose the control mechanism 60 has a lever 68 one end of which overlies the nozzle 62 to function as a baffle member therefor to vary the flow resistance of said nozzle. The size of the restriction 66 and nozzle 62 are so chosen in relation to the range of pressures P$i$ in the supersonic flight speed range of the engine 10 that the pressure ratio across the nozzle 62 is always larger than the critical pressure ratio. The critical pressure ratio for a sharp edged orifice is approximately 1.85. At a supersonic flight speed range, for example between Mach number 2.5 and Mach number 3, the pressure ratio P$i$/P$s$ varies from approximately 8 at Mach number 2.5 to approximately 12 at Mach number 3. The overall pressure ratio of the pressure upstream of the restriction 66 to the pressure downstream of the nozzle 62 may be somewhat less than P$i$/P$s$ because the nozzle 62 discharges into the ambient pressure P$a$ which may be somewhat higher than P$s$. Nevertheless, the pressure ratio P$i$/P$s$ is sufficiently large in said flight speed range that the size of the restriction 66 and nozzle 62 obviously can readily be chosen to maintain the pressure ratio across the nozzle 62 at least equal to said critical pressure ratio of 1.85, even when the nozzle 62 is in its maximum open condition.

The control mechanism 60 includes means for so controlling the lever 68 that its one end substantially completely closes the nozzle 62 when the flight speed of the engine 10 drops below a predetermined supersonic Mach number and said lever substantially completely uncovers the nozzle 62 when the engine flight speed exceeds a higher predetermined supersonic Mach number. The ratio of the absolute values of P$i$ over P$s$ is a measure of the flight speed Mach number and the control mechanism 60 positions the lever 68 in response to changes in said ratio. For this purpose, three bellows-type flexible diaphragms 70, 72 and 74 act against the lever 68, said bellows having moment arms $a$, $b$ and $c$ respectively. The bellows 70 is connected to a static pressure tube or probe 76 by a line 78. The tube 76 is mounted on the aircraft so as to extend into the surrounding undisturbed air flow and has lateral openings 79 whereby the pressure within said tube is equal to the static pressure P$s$ of the surrounding atmosphere. The bellows 72 is connected to the total head tube 58 by the line 64 and a line 80 so as to respond to the impact pressure P$i$ of the surrounding atmosphere relative to the engine 10. The bellows 74 is connected to an air bleed passage 82 intermediate the restrictions 84 and 86 in said passage. The one end of the passage 82 is connected to the line 64 so as to be subject to the impact pressure P$i$ while the other end of said passage opens to the ambient pressure P$a$.

The restrictions 84 and 86 are chosen so that in the design flight speed range, the pressure ratio across the restriction 86 is no less than its critical pressure ratio whereby the pressure intermediate said restrictions, to which the bellows 74 responds, is independent of the ambient pressure P$a$ and is proportional to P$i$. That is, said intermediate pressure is equal to KP$i$ where K is the constant of proportionality. The effect of the ambient pressure P$a$ on the turning moment exerted by the bellows 70, 72 and 74 on the lever 68 can be eliminated by making said bellows of equal area, as illustrated, and by selecting their moment arms to satisfy the equation $a+b=c$. If however the bellows are not of equal area said effect of ambient pressure can still be eliminated by selecting the area and moment arms of each bellows so that the sum of the products of the area and moment arm of each bellows 70 and 72 is equal to the product of the area and moment arm of the bellows 74 in which case the reference characters $a$, $b$ and $c$ can be considered as representing said products instead of simply the bellows moment arms. Hence, as far as the forces on the lever 68 are concerned, the ambient pressure P$a$ can be ignored and the connections of the bellows to the lever 68 have been illustrated on this basis. Actually if the ambient pressure P$a$ were larger than P$s$ the force of the bellows 70 on the lever 68 would have to be the reverse of that illustrated.

Neglecting the metallic elasticity of the bellows of the mechanism 60, it can be shown that the turning moments acting on the lever 68 are balanced when the pressure ratio (absolute values) P$i$/P$s$ is equal to the constant ratio $$\frac{a}{cK-b}$$

where $cK$ must be larger than $b$. It is apparent therefore that the position of the lever 68 depends on the engine flight speed as measured by the ratio of the absolute values of P$i$ to P$s$ and therefore said lever position is a measure of the flight speed as measured by the flight Mach number. The nozzle 62 is positioned, relative to the lever 68, so that at the design flight speed the lever 68 is intermediate to its nozzle closed and its minimum nozzle open positions. Hence any increase in the engine flight speed above the design value results in turning movement of the lever 68 in a counterclockwise direction (as viewed in the drawing) against the metallic spring forces of the bellows. This results in a decrease in the pressure supplied to the chamber 52 of the fuel regulating device 28 whereupon said device operates to decrease the engine fuel supply thereby decreasing the engine flight speed toward said design value. Likewise a decrease in the engine speed from said design value results in clockwise turning movement of the lever 68 toward the nozzle 62 whereupon the control pressure to the fuel regulating device 28 is increased and said device operates to increase the engine fuel supply to increase the engine speed toward said design value.

The operation of the control and fuel regulating mechanism of Fig. 1 may be summarized as follows:

For any fixed position of the lever 68 relative to the nozzle 62 the control pressure in the chamber 52 of the fuel regulating device 28 is independent of the ambient pressure and is proportional to the impact pressure P$i$ and this latter pressure is proportional to the mass air flow into the engine 10. The device 28 operates to maintain the engine fuel supply proportional to said control pressure whereby for a given position of the lever 68 relative to the nozzle 62 the device 28 operates to regulate the engine fuel supply so as to maintain constant the fuel-air ratio of the combustible mixture supplied to the engine combustion chamber 18. The constant of proportionality C between said control pressure and the pressure $Pi$ increases for positions of the lever 68 closer toward the nozzle 62 and said constant becomes unity for the lever position closing said nozzle. Likewise said constant C decreases for lever positions farther away from the nozzle 62. Thus the fuel-air ratio maintained by the device 28 depends on the position of the lever 68, said fuel-air ratio being a maximum when the lever 68 closes the nozzle 62 and being a minimum when the lever 68 is farthest away from said nozzle. Upon an increase in the engine flight Mach number above a predetermined design value, as measured by the ratio of the absolute values of $Pi$ to $Ps$, the lever 68 moves away from the nozzle 62 whereupon the fuel regulating device 28 maintains a lower fuel-air ratio in the combustion chamber 18 to decrease the flight Mach number toward said value. Similarly upon a decrease in the flight Mach number below said predetermined value the lever 68 moves toward the nozzle 62 whereupon the fuel regulating device 28 maintains a higher fuel-air ratio in the engine combustion chamber 18 to increase the flight Mach number toward said value. In this way the fuel-air ratio in the engine combustion chamber is increased and decreased with decrease and increase respectively in the flight Mach number from the predetermined design value. The limits of said fuel air ratio are determined by the limits of adjustment of the nozzle 62 by the lever 68. Thus when the nozzle 62 is completely uncovered by the lever 68 the fuel-air ratio maintained by the regulating device 28 is a predetermined minimum value and when said nozzle is completely closed by said lever said fuel-air ratio is a predetermined maximum value.

With the control mechanism 60 of Fig. 1, the gain of the mechanism can be increased by increasing the flow resistance (for example by decreasing the area) of the restriction 66. By "gain" of said control mechanism is meant the amount of change in the output control pressure produced by a given movement of the control mechanism lever 68. However any increase in the flow resistance of the restriction 66 results in an increase in the time lag between a movement of the control lever 68 and the resulting change in the control pressure in the chamber 52 of the fuel regulating device 28 thereby decreasing the rapidity of the response of the fuel regulating device to movements of the control lever 68. A relay may be interposed in the output line 67 of the control mechanism so that both high gain and rapid response may be obtained. Such an arrangement is illustrated in Fig. 2.

The control mechanism 60a of Fig. 2 is basically the same as the control mechanism 60 of Fig. 1 except the nozzle and associated restriction need not have the relationship specified in connection with Fig. 1 such that the pressure ratio across the nozzle exceeds its critical pressure ratio. Accordingly the parts of the control mechanism 60a of Fig. 2 have been designated by the same reference numerals as the corresponding parts of Fig. 1 except a subscript $a$ has been added thereto. Also the control pressure output line 67 of Fig. 1 has been separated into two sections 67a and 67b in Fig. 2 with a relay 90 interposed between said sections.

In Fig. 2 the relay 90 comprises a lever 92 against which two bellows-type flexible diaphragms 94 and 96 exert opposed turning moments. The bellows 94 is connected to the line 64 by a line 98 so as to respond to the pressure $Pi$. The bellows 96 is connected to the output line 67a of the control mechanism 60a so as to respond to the output pressure of said mechanism. One end of the lever 92 overlies an air bleed nozzle 100 so as to constitute a baffle member for said nozzle. The nozzle 100 is connected to the line 64 by a line 102 having a restriction 104. The output of the relay 90 is connected to the line 67b which has one end connected to the line 102 between the restriction 104 and nozzle 100 and its other end is to be connected to the passage 54 of the fuel regulating device 28 of Fig. 1. Thus the relay 90 is interposed in the output line of the control mechanism 60a between said mechanism and the fuel regulating device whereby the output pressure of the relay 90 functions as the control pressure of the fuel regulating device 28.

As in the case of the nozzle 62 and restriction 66 of Fig. 1, the nozzle 100 and restriction 104 are designed so that the pressure ratio across the nozzle 100 always is no less than its critical pressure ratio in the supersonic flight speed range of the engine 10. Hence the control pressure transmitted to the fuel regulating device 28 by the relay 90 is independent of the ambient pressure and for a given position of the lever 92 of said control pressure is proportional to the pressure $Pi$. Therefore at each position of the lever 68 the fuel regulating device 28 will maintain the fuel-air ratio constant and the limits of the fuel-air ratio are determined by the limits of adjustment of the nozzle 100 by the lever 68.

The gain of the system of Fig. 2 is made larger than that of Fig. 1 by making the flow cross-sectional area of the restriction 66a less than that of the restriction 66. Hence in Fig. 2 a given movement of the control lever 68a produces a larger change in the output pressure in the line 67a than would be produced in the line 67 by the same movement of the control lever 68 in Fig. 1. The change in pressure in the output line 67a controls the relay lever 92 thereby controlling the output pressure of the relay in the line 67b. At this point it should be noted that, in Fig. 2, the pressure ratio across the nozzle 62a need not exceed its critical pressure ratio because only the control pressure transmitted to the fuel regulating device needs to be independent of changes in $Pa$ and proportional to $Pi$. The flow resistance of the restriction 104 is low relative to that of the restriction 66a whereby the addition of the relay 90 increases the speed of response of the control pressure for the fuel regulating device 28 above what said speed of response would be in the absence of the relay 90. At the same time the high flow resistance of the restriction 66a provides for high gain.

In lieu of the control mechanism 60 or 60a other forms of control mechanism employing one or more double restriction air bleed systems may be used for providing a control pressure which, at any given flight speed Mach number, is proportional to $Pi$ (or to some other pressure proportional to the mass air flow into the engine) and for varying the constant of proportionality between said control pressure and $Pi$ with changes in the engine flight Mach number as measured by the ratio of the absolute values of $Pi$ to $Ps$. Such modifications are illustrated in Figs. 3, 4, 5, 6 and 7.

Fig. 3 illustrates a control mechanism 120 comprising a pivoted lever 122 against which bellows 124 and 126 exert opposed turning moments. The bellows 124 is connected to the line 64 so as to be responsive to the pressure $Pi$ while the bellows 126 is connected to the line 78 so as to be responsive to the pressure $Ps$. In order to eliminate the effect of ambient pressure on the turning movements of the lever 122 the bellows 124 is opposed by a sealed evacuated bellows 128 of equal area and the bellows 126 is similarly opposed by a sealed evacuated bellows 130. Obviously the two evacuated bellows 128 and 130 could be combined into a single bellows. One end of the lever 122 overlies an air bleed nozzle 132 which is connected to the line 64 through a restriction 134 and the pressure between said restriction and nozzle is the output pressure of the control mechanism 120. This output pressure is connected direct to the fuel regulating device 28 by the line 67 as in Fig. 1 or to the relay 90 by the line 67a as in Fig. 2.

If the control mechanism 120 is connected direct to the fuel regulating device 28 by the line 67 then, as in the case of the nozzle 62 and restriction 66, the nozzle 132 and restriction 134 are designed so that in the supersonic flight speed range of the engine 10 the pressure ratio across the nozzle 132 is no less than the critical pressure ratio regardless of the position of the lever 122. Also, as in Figs. 1 and 2, the turning movements of the lever 122 obviously depend on changes in the engine flight Mach number from the design value as measured by the ratio (absolute values $Pi/Ps$).

The control mechanism 120 of Fig. 3 has a disadvantage over the control mechanism 60 or 60a of Figs. 1 or 2 in that evacuated bellows are required in Fig. 3. Other forms of the control mechanism having the advantage of a smaller number of bellows are illustrated in Figs. 4, 5, 6 and 7.

Fig. 4 illustrates a control mechanism 140 comprising a closed chamber 142 connected to the line 78 so as to be responsive to the pressure $Ps$. A lever 144 is pivotally supported within said chamber and bellows-type flexible diaphragms 146 and 148, also disposed within said chamber, exert opposed turning moments on the lever 144. The bellows 146 is connected to the line 64 so that the interior of said bellows is subjected to the pressure $Pi$. The bellows 148 is connected to an air bleed passage 150 between two serially disposed restrictions 152 and 154 of said passage, one end of said passage being connected to the line 64 and its other end discharging into the ambient atmosphere. The restrictions 152 and 154 are designed so that in the design flight speed range the pressure ratio across the restrictions 154 is no less than the critical pressure ratio. Thus, like the bellows 74 of Fig. 1, the interior of the bellows 148 is subject to a pressure $KPi$ where K is a constant. In addition one end of the lever 144 overlies an air bleed nozzle 156 which is connected to the line 64 through a restriction 158. The controller output line 67 or 67a is connected between the nozzle 156 and the restriction 158. With this construction of Fig. 4 it can readily be seen that, as in Figs. 1, 2 and 3, the position of the lever 144 about its pivot axis depends on the ratio of the absolute values of $Pi$ to $Ps$, independent of changes in the ambient pressure $Pa$, whereby the position of the lever 144 depends on the flight speed Mach number.

The control mechanism of Fig. 5 is generally similar to that of Fig. 4 so that the parts of the control mechanism of Fig. 5 have been designated by the same reference numerals but with a subscript $a$ added thereto as the corresponding parts of Fig. 4. The control mechanism of Fig. 5 is like that of Fig. 4 except in Fig. 5 the closed chamber 142a, instead of the bellows 148a, is subject to the pressure $KPi$ and the bellows 148a instead of the closed chamber 142a is subject to the pressure $Ps$. Also in Fig. 5 the restriction 154a is illustrated as having a venturi-like profile. The restrictions 152a and 154a are designed so that at flight speeds above the design flight speed the flow velocity at the venturi throat of the restriction 154a is sonic and therefore the static pressure ratio across the restriction 154a is no less than its critical pressure ratio. Because of the venturi-like profile of the restriction 154a at least some of the pressure drop between the venturi entrance and the venturi throat of said restriction will be recovered in the diverging portion of the restriction. Hence the critical pressure ratio of a restriction having a venturi-like profile is less than the critical pressure ratio of, for example, a sharp-edged orifice-type restriction. Therefore the venturi-like profile of the restriction 154a permits the use of lower values of K than could be obtained if, for example, the restriction 154a were a sharp-edged orifice. No further description of the structure of Fig. 5 appears necessary.

Fig. 6 illustrates a control mechanism 160 comprising a closed chamber 162 within which a bellows-type flexible diaphragm 164 is disposed. The interior of the chamber 162 is connected to an air bleed passage 166 between two serially disposed restrictions 168 and 170 of said passage. The restriction 170 may have a venturi-like profile similar to that of the restriction 154a of Fig. 5. The one end of the passage 166 is connected to the line 64 and the other end of said passage is connected to the low pressure zone of an ejector tube 172. The tube 172 is disposed for fluid flow therethrough and for this purpose may be disposed in the path of the gas flow through the engine 10 or it may be disposed outside the engine for flow of the surrounding atmosphere therethrough. The tube 172 has a reduced area entrance 174 such that said tube functions as an ejector pump drawing air through the passage 166 to maintain the pressure ratio across the downstream restriction 170 larger than the critical pressure ratio in the design flight speed range of the engine. The interior of the bellows 164 is connected to the line 78 so as to be subject to the pressure $Ps$. The free end of the bellows 164 is movable toward and away from an air bleed nozzle 176 to function as an air baffle member for said nozzle. The nozzle 176 is connected to the line 64 through a restriction 178 and the output line 67 or 67a of the control mechanism is connected between the nozzle 176 and the restriction 178.

With the arrangement of Fig. 6 the free end of the bellows 164 is balanced relative to the nozzle 176 when $KPi=Ps$ where $Pi$ and $Ps$ are expressed in absolute values and the spring force of the bellows is neglected. Hence in Fig. 6 the position of the free end of the bellows 164 is a measure of the ratio of the absolute values of $Pi$ to $Ps$ and therefore said bellows free end position is a measure of the flight Mach number. At said balanced condition, the pressure $KPi$, between the restrictions 168 and 170, is equal to $Ps$. Hence the ejector tube 172 or some other aspirating means is necessary in Fig. 6 to provide a low enough discharge pressure for the passage 166 to keep the pressure ratio across the restriction 170 at least equal to its critical pressure ratio.

As in the case of the control mechanisms 60 and 120 the control mechanisms 140, 140a and 160 can be used with or without a relay such as 90 interposed in their output connection to the fuel regulating device 28. If no such relay is used in Figs. 4, 5 and 6, then, as in Figs. 1 and 3, the pressure ratio across the nozzle should be made no less than the critical pressure ratio in the flight speed range. If the control mechanism of Fig. 5 is used without a relay then, in addition to or in lieu of providing the restriction 154a with a venturi-like profile, the use of an ejector tube, such as the tube 172, may be necessary in Fig. 5 in order to make possible the provision of a low enough pressure within the chamber 142a so that the pressure ratio across the nozzle 156a exceeds the critical ratio. Although, not necessary, such an ejector tube or other aspirating means could also be added to the other modifications of Figs. 1, 2, 4 and 5. Such an additional would increase the complexity of the control mechanisms of said other modifications but would have the advantage of increasing their accuracy by making possible the use of lower value of K. Lower values of K can also be obtained in Figs. 1, 2 and 4 by providing their restrictions 86, 86a and 154 with a venturi-like profile as in the case of the restriction 154a of Fig. 5.

The modifications of Figs. 4, 5 and 6 have the advantage in that they use a smaller number of bellows than Figs. 1, 2 and 3. The modifications of Figs. 4, 5 and 6 however use a closed chamber into which the air bleed nozzles discharge whereby each of these three modifications has the problem of keeping its nozzle air bleed sufficiently low so as not to appreciably affect the pressure in its said closed chamber. Fig. 7 is a modification of Fig. 4 in which this problem is eliminated by reversing the direction of flow through the control mechanism nozzle. Also in Fig. 7 a relay, equivalent to the relay 90, is made an integral part of the control mechanism unit.

Fig. 7 illustrates a combined control and relay unit 180 comprising a control section 182 and a relay section 184 said sections being separated by a partition 183. The control section 182 is divided into a pair of chambers 186 and 188 by a partition 190 and bellows-type flexible diaphragms 192 and 194, 192 being smaller and co-axially surrounded by the larger bellows 194 to provide another chamber therebetween. One end of each bellows 192 and 194 is secured to the partition 190 and the movable ends of said bellows are connected to a bar 196 the opposite ends of which are connected to ends of links 198 and 200 disposed in chambers 186 and 188 respectively. The links 198 and 200 are parallel and of equal length and their other ends are provided with fixed pivots 202 and 204 respectively. The chamber 186 is connected to an air bleed passage 206 between a pair of restrictions 208 and 210 serially disposed in said passage. The restriction 208 may have a venturi-like profile similar to that of the restriction 154a of Fig. 5. One end of the passage 206 is connected to the line 64 and its other opens into the ambient atmosphere. The restrictions 208 and 210 are designed so that the pressure ratio across the downstream restriction 208 is no less than its critical pressure ratio in the supersonic flight speed range of the engine. Therefore, within said speed range, the pressure in the chamber 186 is equal to $KP_i$ where K is a constant. The space between the bellows 192 and 194 is connected to the line 78 so that said space is subject to the pressure $P_s$. The chamber 188 and the interior of the bellows 192 are connected to the line 64 and are therefore subject to the pressure $P_i$. An air nozzle 212 is secured in the chamber 188 on the partition 183 for air flow into said nozzle from said chamber. The movable end of the lever or link 200 overlies the end of the nozzle 212 to vary the flow resistance of said nozzle.

The relay section 184 of the unit 180 includes a chamber 214 which is open to the ambient pressure $P_a$ by one or more openings 216. A bellows-type flexible diaphragm 218 is disposed in the chamber 214 with its fixed end secured to the partition 183 for air flow into said bellows from the nozzle 212. The bellows 218 is vented to the ambient pressure through a restricted opening 220. A lever 222 is pivotally supported within the chamber 214 and the bellows 218 and a bellows-type flexible diaphragm 224 exert opposed turning moments on said lever. The interior of the bellows 224 is connected to the line 64 so as to respond to the pressure $P_i$. The movable end of the lever 222 overlies an air bleed nozzle 226. The nozzle 226 is connected to the line 64 through a restriction 228 and the output line 67b of the relay unit is connected between said nozzle and restriction 228. As in the case of the nozzle and associated restriction of the relay 90, the nozzle 226 and restriction 228 are designed so that the pressure ratio across the nozzle 226 is no less than its critical pressure ratio in the supersonic flight speed range of the engine. Obviously the relative sizes of the bellows 192 and 194 and the magnitude of K should be such that, upon an increase in $P_i$, the net increase in the force of the bellows 194 on the bar 196 is larger than the net increase in force of the bellows 192 on said bar.

With the above described construction of Fig. 7, the position of the rod 196 depends on the ratio of the absolute values of $P_i$ to $P_s$ and therefore said rod position changes with changes in engine flight Mach number. An increase in the engine flight Mach number from the design value causes the rod 196 to move toward the right (Fig. 7) to effect a closing adjustment of the nozzle 212 thereby decreasing the pressure in the relay bellows 218. A decrease in pressure within the relay bellows 218 causes the relay lever 222 to move away from the nozzle 226 to produce a decrease in the relay output control pressure in the line 67b which is transmitted to the chamber 52 of the fuel regulating device. Likewise a decrease in the engine flight Mach number from the design value causes the rod 196 to move in the opposite direction to affect an opening adjustment of the nozzle 212 thereby causing the pressure in the relay bellows 218 to increase. This latter increase in pressure causes the relay lever 222 to move toward the nozzle 226 to increase the relay output control pressure in the line 67b.

In the modification of Figs. 1, 2, 4, 5, 6 and 7 the design flight Mach number can be changed by varying one of the restrictions in the double restriction air flow passage from which the pressure $KP_i$ is obtained. For example in Fig. 7 the design flight Mach number could be made adjustable by making the restriction 208 adjustable.

As previously stated, the thrust output of an aircraft jet engine generally is controlled by regulating the engine fuel supply and/or by regulating the area of the engine exhaust nozzle. Hence the control pressure in the line 67 or 67b instead of being used to regulate the engine fuel supply obviously could be used to regulate the throat area of the engine exhaust nozzle 22 by increasing and decreasing said area with increase and decrease, respectively, in said pressure.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. Control apparatus for an aircraft engine having a combustion chamber; said apparatus comprising means providing an air flow path having a pair of serially disposed air flow restrictions and having an open upstream end terminating in a pitot tube responsive to the impact air pressure resulting from flight through the surrounding atmosphere and having an open downstream end discharging into a sufficiently low pressure that, during flight above a predetermined speed, the pressure ratio across the downstream restriction is at least equal to its critical pressure ratio; means responsive to changes in the air pressure intermediate said pair of restrictions for varying the rate of fuel supply to said combustion chamber; and means responsive to changes in aircraft flight speed for varying the magnitude of one of said restrictions.

2. Control apparatus for an aircraft engine; said apparatus comprising a member movable for varying the engine thrust; means providing a pressure $P_i$ substantially equal to the impact pressure of the surrounding atmosphere relative to said engine; means providing a pressure substantially equal to the product $KP_i$ where K is a constant; means providing a pressure $P_s$ substantially equal to the static pressure of said surrounding atmosphere; and mechanism subject to said three pressures and operatively connected to said member for moving said member such that its position is a measure of the ratio of the absolute values of $P_i$ to $P_s$.

3. Control apparatus for an aircraft engine; said apparatus comprising a pitot tube responsive to the impact pressure of the surrounding atmosphere relative to said engine; means including an air flow path having a pair of serially disposed restrictions and having its upstream end connected to said pitot tube and having its downstream end connected to a lower pressure such that, in the operating range of the apparatus, the pressure ratio across the downstream restriction is at least equal to its critical pressure ratio whereby the pressure intermediate said restrictions is equal to $KP_i$ where K is a constant; a static pressure tube for measuring the static pressure of said surrounding atmosphere; and means subject to said impact pressure, said static pressure and said $KP_i$ pressure for providing an engine control signal.

4. Control apparatus as recited in claim 3 in which said downstream restriction has a venturi-like profile.

5. Control apparatus for an aircraft engine; said apparatus comprising a member movable in opposite directions for increasing or decreasing the thrust of said engine; means providing a pressure $P_i$, substantially equal to the impact pressure of the surrounding atmosphere relative to said engine; means providing a pressure equal to the product $KPi$, where K is a constant fraction; means providing a pressure $Ps$, substantially equal to the static pressure of the surrounding atmosphere; a first device subject to the pressures $KPi$ and $Ps$ in opposition and operatively connected to said member for urging said member in a thrust reducing direction with a force proportional to the difference between said pressures; and a second device subject to the pressures $Pi$ and $Ps$ in opposition and operatively connected to said member for urging said member in a thrust increasing direction.

6. Apparatus as recited in claim 5 in which each of said devices comprises a flexible diaphragm.

7. Apparatus as recited in claim 5 and including engine fuel regulating means and means operatively associating said member and fuel regulating means so that said member is movable to control the engine thrust by varying the rate of fuel supply to the engine.

8. Control apparatus for an aircraft engine; said apparatus comprising a pitot tube directed forwardly into the surrounding atmosphere; a first air bleed passageway connected to said pitot tube and having a pair of serially disposed restrictions; a pair of flexible diaphragms forming the opposed walls of a chamber, one of said diaphragms being larger than the other; means for subjecting the facing sides of said diaphragms to the static pressure of the surrounding atmosphere; means for subjecting the other side of the large diaphragm to the pressure between said restrictions; means for subjecting the other side of the small diaphragm to the impact pressure provided by said pitot tube; a second air bleed passageway connected to said pitot tube and having a pair of serially disposed restrictions; a member connected to said diaphragms for movement thereby to vary the upstream restriction of said second passageway; a third air bleed passageway connected to said pitot tube and having a pair of serially disposed restrictions; means responsive to the pressure intermediate the restrictions of said second passageway and to said impact pressure for varying the downstream restriction of said third passageway; and an engine control device operatively connected to the third passageway between its said restrictions so as to respond to the pressure between said restrictions.

9. Control apparatus for an aircraft engine having means for regulating the engine fuel supply; said apparatus comprising means providing a control pressure proportional to the rate of mass air flow into the engine; means for varying the proportionality ratio of said mass air flow rate and control pressure with changes in a condition indicative of the aircraft flight speed; and means responsive to changes in said control pressure for effecting operation of said fuel regulating means.

10. Control apparatus for an aircraft engine having means for regulating its thrust output; said apparatus comprising means providing a control pressure proportional to the rate of mass air flow into the engine; means for varying the proportionality ratio of said mass air flow rate and control pressure with changes in a condition indicative of the aircraft flight speed; and means responsive to changes in said control pressure for effecting operation of said thrust regulating means.

11. Control apparatus for an aircraft engine having means for regulating the engine fuel supply; said apparatus comprising means providing a control pressure proportional to the rate of mass air flow into the engine; means responsive to changes in the ratio of $Pi$ to $Ps$ where $Pi$ is substantially equal to the absolute value of the impact pressure of the surrounding atmosphere and $Ps$ is substantially equal to the absolute value of the static of the surrounding atmosphere; means controlled by said responsive means for varying the proportionality ratio of said mass air flow rate and said control pressure; and means responsive to changes in said control pressure for effecting operation of said fuel regulating means so that an increase or decrease in said ratio results in a decrease or increase, respectively, in the rate of fuel supply to the engine.

References Cited in the file of this patent

UNITED STATES PATENTS

| | | |
|---|---|---|
| 2,641,105 | Drake | June 9, 1953 |
| 2,642,237 | Page et al. | June 16, 1953 |
| 2,643,514 | Jubb | June 30, 1953 |
| 2,645,240 | Drake | July 14, 1953 |
| 2,652,813 | Reuter et al. | Sept. 27, 1953 |
| 2,671,620 | Andrews | Mar. 9, 1954 |
| 2,775,231 | Silver | Dec. 25, 1956 |